United States Patent
Harrison

(10) Patent No.: US 10,698,568 B2
(45) Date of Patent: Jun. 30, 2020

(54) SYSTEMS AND METHODS FOR IMPROVED CELLULAR QUALITY OF EXPERIENCE

(71) Applicant: T-Mobile USA, Inc., Bellevue, WA (US)

(72) Inventor: Kyle Edward Harrison, Albuquerque, NM (US)

(73) Assignee: T-Mobile USA, Inc., Bellevue, WA (US)

( * ) Notice: Subject to any disclaimer, the term of this patent is extended or adjusted under 35 U.S.C. 154(b) by 464 days.

(21) Appl. No.: 15/196,469

(22) Filed: Jun. 29, 2016

(65) Prior Publication Data

US 2018/0004362 A1 Jan. 4, 2018

(51) Int. Cl.
| | |
|---|---|
| *G06F 15/177* | (2006.01) |
| *G06F 3/0482* | (2013.01) |
| *H04M 1/725* | (2006.01) |
| *G06F 3/0488* | (2013.01) |

(52) U.S. Cl.
CPC ........ *G06F 3/0482* (2013.01); *G06F 3/04886* (2013.01); *H04M 1/72522* (2013.01); *G06F 2203/04806* (2013.01); *H04M 1/72572* (2013.01)

(58) Field of Classification Search
CPC .............. G06F 3/0482; G06F 3/04886; G06F 2203/04806; H04M 1/72522; H04M 1/72572
See application file for complete search history.

(56) References Cited

U.S. PATENT DOCUMENTS

| | | | | |
|---|---|---|---|---|
| 7,769,840 | B1* | 8/2010 | House | H04L 43/0817 340/507 |
| 9,706,515 | B1* | 7/2017 | Chadwick | H04W 64/00 |
| 2004/0253947 | A1* | 12/2004 | Phillips | H04W 48/18 455/422.1 |
| 2007/0191005 | A1* | 8/2007 | Cooper | H04W 48/16 455/434 |
| 2008/0132249 | A1* | 6/2008 | Hamilton | G01C 21/26 455/456.3 |

(Continued)

OTHER PUBLICATIONS

"WIII My Phone Work," Dec. 19, 2015, https://web.archive.org/web/20151219194143/https://willmyphonework.net/AdvanceLookup, 1 page (Year: 2015).*

(Continued)

*Primary Examiner* — Kieu D Vu
*Assistant Examiner* — Asteway T Gattew
(74) *Attorney, Agent, or Firm* — Lee & Hayes, P.C.

(57) ABSTRACT

Systems and methods for providing an improved cellular user quality of experience (QoE) are disclosed. The system can comprise a database including multiple cell towers and their operating frequencies. The system can also include a database of frequencies for a plurality of user equipment (UE). The system enables user to input a chosen UE, a chosen location, and a connection type. The system can then provide a compatibility map depicting the coverage provided by cell towers proximate the chosen location that operate at the same frequencies as the chosen UE. Improved knowledge of UE and cell tower compatibility in areas of interest to the user can improve cellular customer satisfaction, retention, and loyalty, and reduce UE returns.

20 Claims, 12 Drawing Sheets

(56) References Cited

U.S. PATENT DOCUMENTS

| | | | | |
|---|---|---|---|---|
| 2008/0165143 A1* | 7/2008 | Tolmasky | ............ | G06F 3/04886 345/173 |
| 2011/0255516 A1* | 10/2011 | Pawar | .................... | H04W 36/14 370/332 |
| 2013/0095861 A1* | 4/2013 | Li | ......................... | G01S 5/0263 455/456.6 |
| 2013/0295962 A1* | 11/2013 | Manroa | .................... | H04W 4/02 455/456.3 |
| 2014/0099967 A1* | 4/2014 | Egner | .................... | H04W 28/26 455/452.2 |
| 2015/0117323 A1* | 4/2015 | Hiben | .................... | H04L 12/189 370/329 |
| 2016/0269923 A1* | 9/2016 | Celik | .................... | H04W 24/10 |

OTHER PUBLICATIONS

"FrequencyCheck," Mar. 16, 2016, https://www.frequencycheck.com/models, 1 page (Year: 2016).*

* cited by examiner

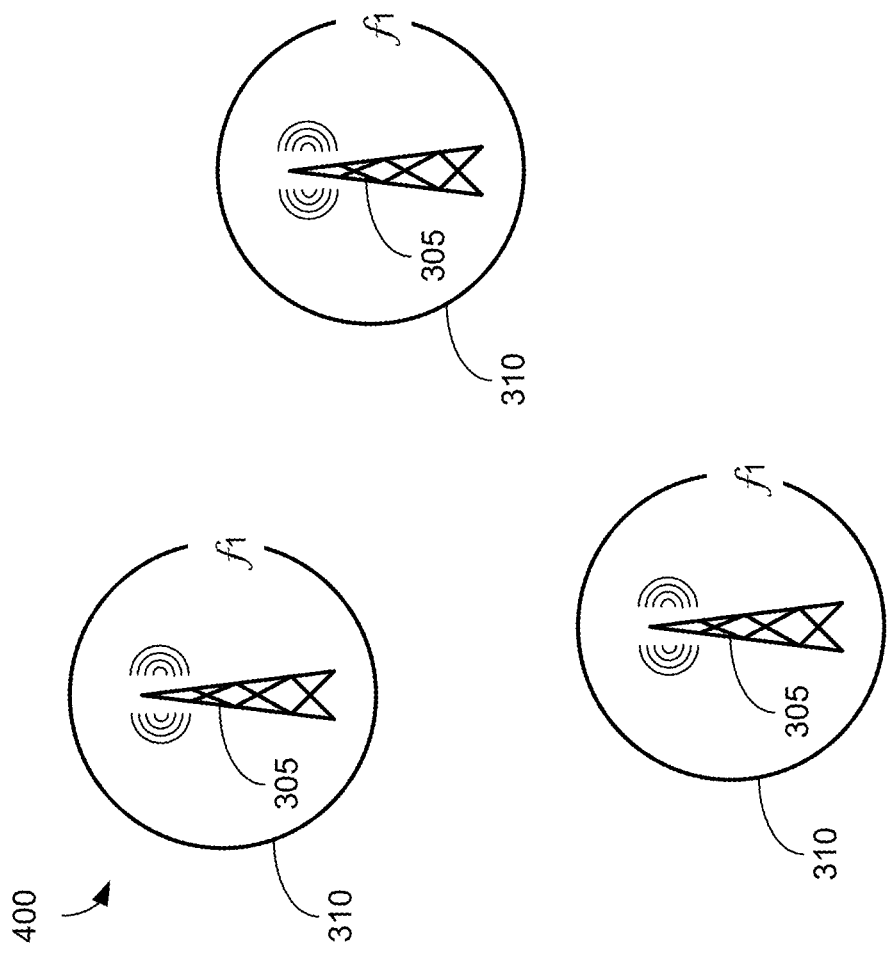

SYSTEMS AND METHODS FOR IMPROVED CELLULAR QUALITY OF EXPERIENCE

BACKGROUND

The combination of cellular technology and modern smart phones (collectively, "user equipment," or UEs), among other things, has created an explosion in the volume of data that is provided wirelessly to users. Various applications including, for example, Facebook®, You Tube®, voice calling, and texting all require digital bandwidth. This data can be provided over various cellular networks (e.g., 2G, 3G, 4G, and 4G LTE), which each utilize various radio frequencies.

Because each frequency can provide a finite number of channels and can carry a finite amount of data, UEs tend to operate in one or more frequency ranges based on, among other things, the UE category, the type of connection made (e.g., 2G, 3G, 4G, and 4G LTE), the type of cell tower, and the frequencies that have available bandwidth. "Traditional" cellular connections, for example, are generally made in the 824-896 MHz range, while more modern long-term evolution (LTE) connections (in North America) generally operate on a wide variety of frequencies (e.g., 700, 750, 800, 850, 1900, 1700/2100, 2300, 2500, and 2600 MHz). UEs also generally upload and download data on different frequencies.

As a result, cell towers also generally broadcast and receive on a number of different frequencies. Cell towers may provide frequencies for legacy technologies (e.g., 2G and 3G) as well as more modern technologies such as LTE. If a cell tower with an appropriate frequency range is not available for a particular UE, however, it can be difficult or impossible for the UE to operate.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A-4C are schematics of the cellular network frequency map of FIG. 3 divided into individual frequency maps, in accordance with some examples of the present disclosure.

DETAILED DESCRIPTION

Figure 1:
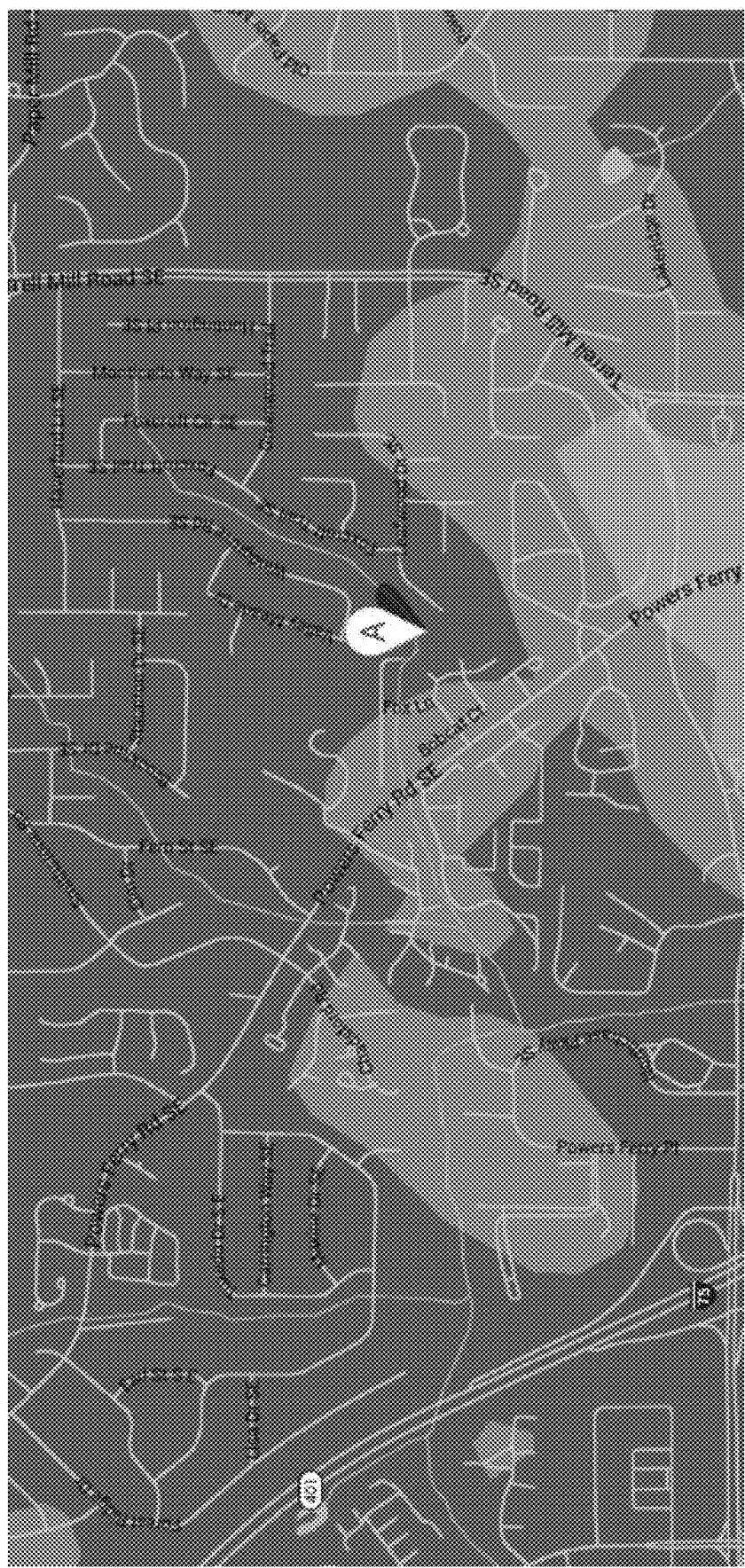
FIG. 1 is a schematic of a conventional cellular coverage map.

Examples of the present disclosure relate generally to cellular coverage mapping and specifically to systems and methods for providing cellular coverage mapping based on the frequencies available in certain areas and the operational frequencies for various user equipment (UEs). Users can enter locations of interest into a graphical user interface (GUI) and receive information regarding which frequencies are available and which UEs operate on those frequencies.

To simplify and clarify explanation, the disclosure is described herein as a system and method for analyzing, tracking, and fixing issues related to a user's cellular quality of experience (QoE) based on frequency and connection issues. One skilled in the art will recognize, however, that the disclosure is not so limited. The system can also be used, for example and not limitation, with other types of networks, including other wireless and wired networks. In addition, the disclosure provided below is related to current cellular technologies (e.g., 2G, 3G, 4G, and 4G LTE (Long Term Evolution)), but is equally applicable to other network technologies, including technologies developed after this disclosure.

The metrics, methods, and steps described hereinafter as making up the various elements of the present disclosure are intended to be illustrative and not restrictive. Many suitable datasets, applications, and networks that would perform the same or a similar function as the systems described herein are intended to be embraced within the scope of the disclosure. Such other systems and methods not described herein can include, but are not limited to, systems, networks, and technologies that are developed after the time of the development of the disclosure.

Users tend to user their UEs in just a few locations, or "locations of interest." A high proportion of the time, users use their UEs to receive calls and access the internet (among other things) from their home or their work, for example. Thus, while the user may also use their UE in the car, when out to eat, and in other instances, they are primarily concerned with two or three locations of interest. A user may wish to ensure that they have good reception at home, at work, and perhaps in another geographic location, or location of interest, where they spend a lot of time (e.g., a parent's house, favorite restaurant, or significant other's house). The remaining locations may be less important because less time is spent there and some degree of variability may be expected.

Having poor reception at home, for example, can be very difficult and may lead a user to seek out another service provider. Reception in the home can vary based on a number of factors including, but not limited to, the construction and wiring of the house, the surrounding topography and geography, and the distance from the house to the nearest cell tower. Another factor, however, is whether the nearest cell tower operates at the same frequencies as the user's UE. If, for example, the nearest cell tower operates at a different frequency than the user's UE, then the UE may be forced to connect to a more distant cell tower, to connect at a frequency associated with a legacy connection (e.g., currently 2G or 3G, instead of 4G LTE), or not be able to connect at all.

Any of these solutions can result in a less than desirable connection and lower than expected performance. If a UE is forced to connect to a more distant cell tower, for example, the connection may be too weak to support full performance. Similarly, if a UE connects to a legacy-type connection, instead of using a state-of-the-art connection, performance can be reduced. Obviously, if a UE is unable to connect, or unable to connect consistently, especially at home or work, the user will likely be dissatisfied with their service.

As shown in FIG. 1, in the past, service providers have only been able to provide generic "coverage maps." Conventional coverage maps are useful, but tend to only show general swathes of information. The map may not provide information with high enough granularity to determine that although you live in an area with generally good coverage, for example, the cell tower nearest your house does not operate on the same frequency as your UE. In other words, the coverage maps indicate where there is some cellular coverage, but generally do not provide information about what types of connections may be available (e.g., 2G, 3G, or 4G LTE) and what frequencies are available in your area. Thus, even if 4G LTE coverage is available in the user's area, if the coverage is broadcast and received at different frequencies than those used by the user's UE, it is of little consequence. The user's UE will likely still not perform as desired.

As a result, in the past, users have been forced to buy a new UE and then simply try it in their areas of interest to see if, and how well, it works. Service providers generally provide a 30-day return period to accommodate possible performance issues. This is inconvenient for both the user and the service provider, however. The user is forced to try the new UE at home and at work, for example. If performance is lacking, the user must then return to the store, or mail the UE back to the service provider, and try again. This can be a long and frustrating process for the user. Similarly, the service provider must then receive a now slightly used phone, repackage it for sale, which can include sending it back to the manufacturer, and sell another UE to the user in the hope that it will be more effective. In addition, the service provider must deal with a less than satisfied customer, which can result in additional refunds or adjustments in an attempt to placate the user.

To this end, examples of the present disclosure can comprise systems and methods to provide customizable, detailed coverage maps to educate users about which UEs will be most effective in their areas of interest. The system can provide coverage maps tailored to the user's areas of interest and can enable the user to review various UEs based on their operating frequencies and the operating frequencies of cell towers in their areas of interest. The system can enable users to choose UEs that, based on the available frequencies, are most like to work effectively in the user's areas of interest. The system can reduce, or eliminate, the frustration and cost associated with the conventional "trial and error" method discussed above.

Figure 2:
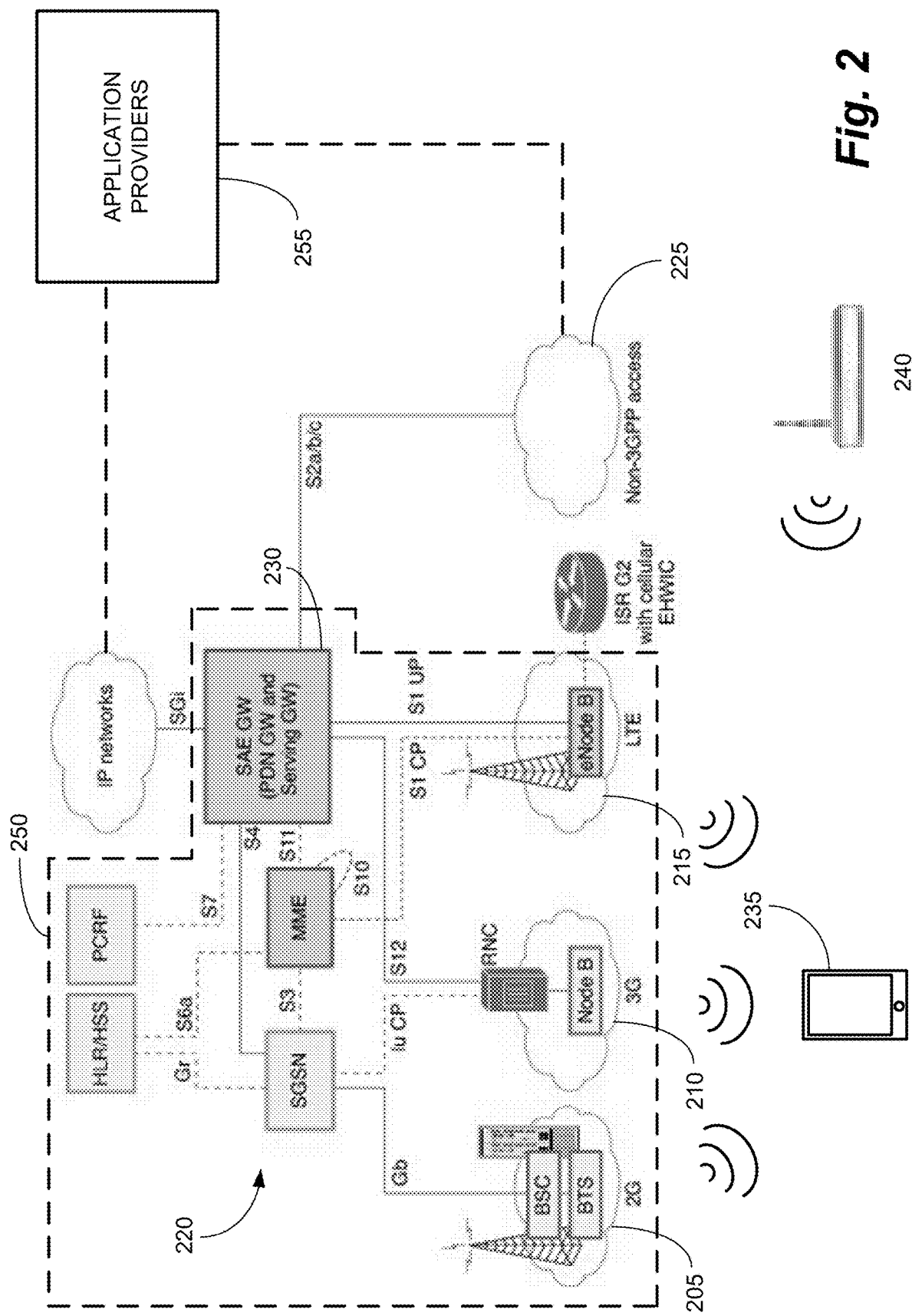
FIG. 2 is a schematic of a conventional cellular/wireless network.

FIG. 2 depicts a conventional cellular network including 2G 205, 3G 210, and 4G LTE 215 components. Of course, future technologies, such as, for example, 5G and device-to-device (D2D) components could also be included and are contemplated herein. As is known in the art, data can be routed from the internet or other sources using a circuit switched modem connection (or non-3GPP connection) 220, which provides relatively low data rates, or via IP based packet switched 225 connections, which results is higher bandwidth. The LTE system 215, which is purely IP based, essentially "flattens" the architecture, with data going straight from the internet to the Service Architecture Evolution Gateway (SAE GW) 230 to evolved Node B transceivers 215, enabling higher throughput. Many UEs 235 also have wireless local area network (WLAN) 240 capabilities, in some cases enabling even higher throughput. In some cases, cellular carriers may use WLAN communications in addition to, or instead of, cellular communications.

Conventional quality-of-service (QoS) systems 250 generally only cover the cellular system side components (e.g., gateways 230, towers 215, etc.). Notably, one major component that is outside the purview of the conventional QoS system 250 is the UE 235. This can include a wide variety of phones, smart phones, tablets, and computers and can also include a wide variety of operating systems (e.g., Windows, iOS, Android, etc.) and operating frequencies. UEs 235 also includes a wide variety of physical layouts, which can affect, for example, antenna reception, processor speed, and battery life. Thus, because conventional QoS techniques do not take into account the operating frequencies of various UEs 235 and compare them to the operating frequencies of the cell towers 215 in question, diagnosing poor performance is often a guessing game. In other words, it is unclear whether the poor performance is caused by physical issues (e.g., obstacles between the cell tower 215 and the UE 235), problems caused by the type of antenna, or other equipment, used on the UE 235, or simply because the UE 235 and the cell tower 215 operate on disparate frequencies. The latter problem is obviously not resolvable without replacing the UE 235 with a UE 235 operating an appropriate frequency.

In addition, application providers 255 such as, for example and not limitation, Twitter, Facebook, Instagram, and You Tube provide mobile applications for use on UE 235. Some, like You Tube, require relatively high data bandwidth to stream or download videos, for example, but are less dependent on response times. Others, like online games, may instead require fast response times and fast cellular handovers (i.e., handing the UE 235 from one cellular tower 215 to the next as the user travels) to maintain continuity of play. Still other applications, such as making voice calls, have much lower bandwidth demands, but may require very low error rates to prevent dropped calls and audio artifacts, for example. Machine-to-Machine (M2M) communications may require faster handovers from cell tower 215 to cell tower 215, for example, because vehicles are moving quickly past cell towers 215, but require relatively small bandwidth.

Each of these applications can be easily handled by a strong 4G LTE connection. Unfortunately, if the UE 235 and the cell tower 215 do not operate on the same 4G LTE frequencies, this this type of service many not be available. Thus, in some cases, the UE 235 may be forced to use legacy 2G or 3G connections, which may not provide the necessary or expected performance. As discussed below, examples of the present disclosure can enable cellular service providers to determine whether a UE 235 is compatible with the areas of interest for a user based on the frequencies available in that area, among other things.

Figure 3:
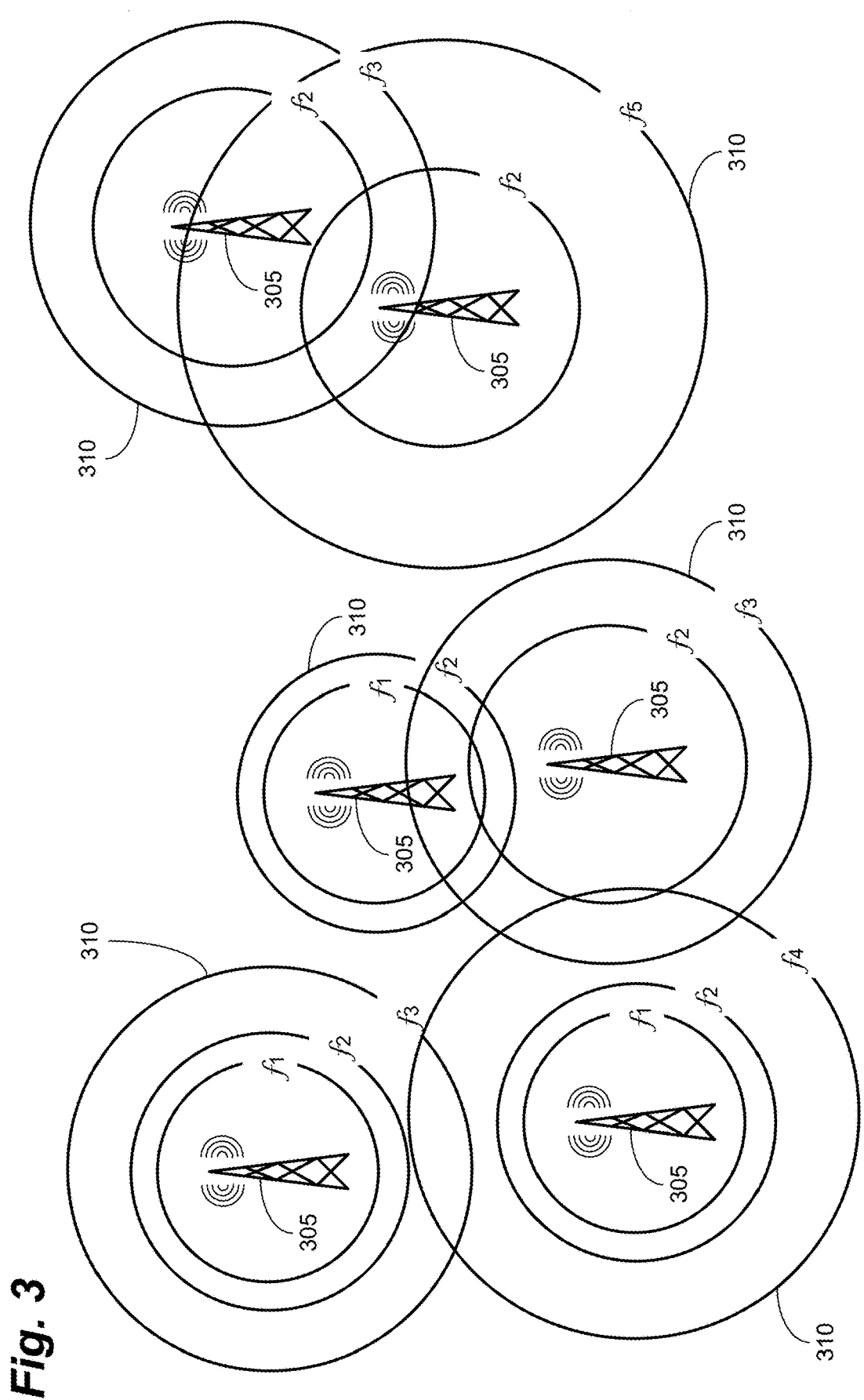
FIG. 3 is a schematic of a cellular network frequency map with multiple frequencies, in accordance with some examples of the present disclosure.

To this end, data collected from UE manufacturers and cellular providers can be aggregated into a database that can be used to create a highly granular map. As shown in FIG. 3, for example, a map 300 can be compiled including all of the cell towers 305 the service provider has in a given area (e.g., a neighborhood, city, state, or region). The cell towers 305 can be cell towers 305 the service provider owns, leases, or otherwise has access to. The map 300 can also include the frequencies, f at which each of the towers 305 is operating. As the frequency increases, the range of the signal decreases. As a result, in some examples, the map 300 can also provide an estimated range for each frequency, as depicted by the different sized circles 310.

Of course, while FIG. 3 discloses cell towers 305, maps could also be included for other types of communication points. Microcells, picocells, and femtocells, for example, are smaller, lower powered devices that can be used to provide additional cellular coverage and/or additional bandwidth in busy areas. In addition, some carriers also use WLAN to augment or replace cellular coverage in problem areas. Similarly, as more and more devices become internet enabled—the so-called "internet-of-things"—each of these devices could also be used to provide additional coverage. To this end, the map 300 could also include frequencies and coverage for these additional communication points, as part of the complete communications solution.

As shown in FIG. 4A, the circles 310 for each frequency can be converted into a frequency specific map 400. In this case, the map 400 can specific to a first frequency, $f_1$. As shown, $f_1$ can represent a fairly high frequency with a more limited range. Thus, areas of interest located within range of cell towers 305 broadcasting at $f_1$ will likely have high data bandwidth. But, due to the limited range at $f_1$, coverage may be spotty, as indicated by the non-overlapping circles 310.

Figure 4B:
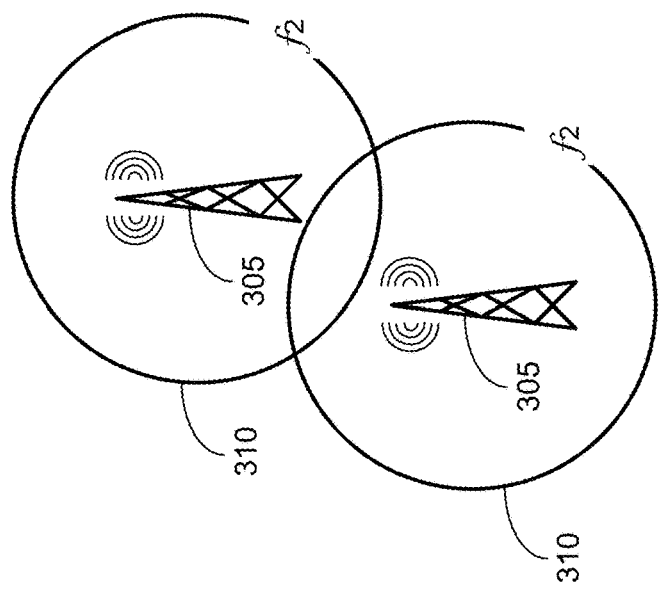
Figure 4B:
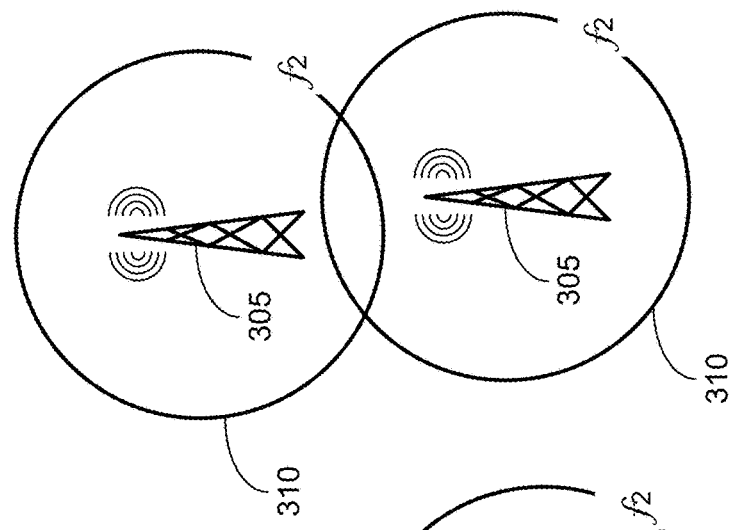
Figure 4B:
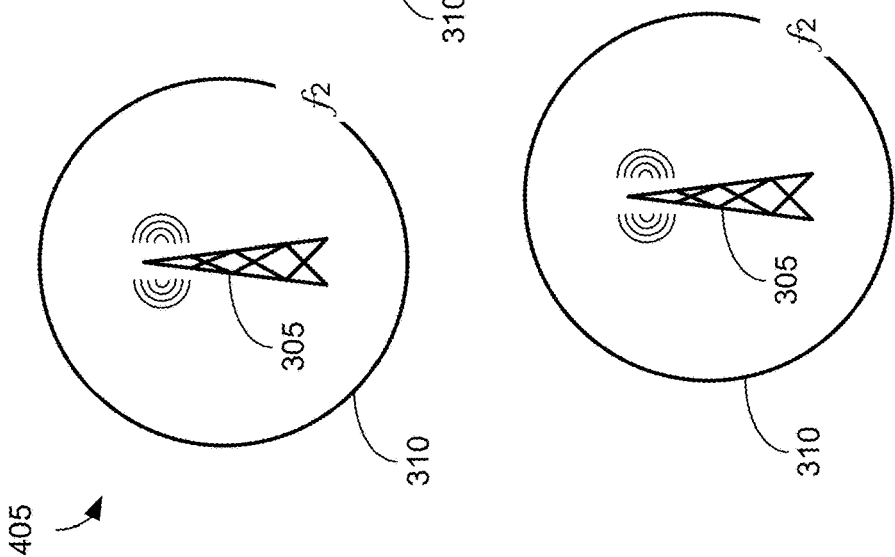

As shown in FIG. 4B, a separate map 405 can also be created for a second frequency, $f_2$. $f_2$ can be, for example, a slightly lower frequency that results in slightly lower bandwidth. $f_2$ may be available on more cell towers 305, however, resulting in more thorough coverage. As shown, in many areas, the cell towers 305 using $f_2$ are close enough to provide overlapping circles 310, which can provide consistent coverage when moving from one location to another and redundancy when choosing a cell tower 305 to connect to. In other words, if one cell tower 305a is overloaded, but another cell tower 305b has excess capacity, a user located in an area of overlap 410 can simply connect to the available cell tower 305b.

Figure 4C:
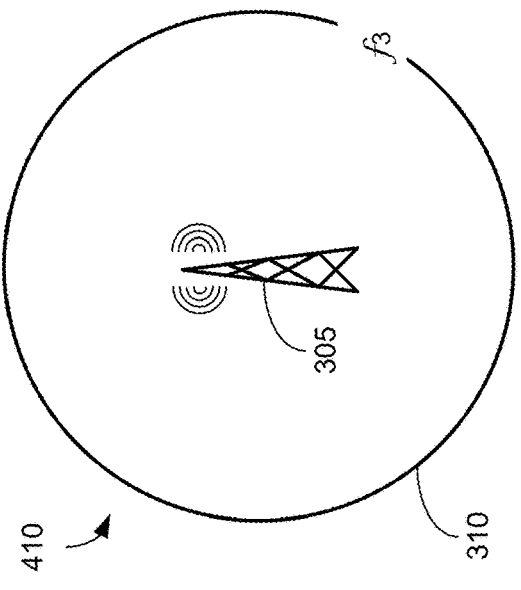
Figure 4C:
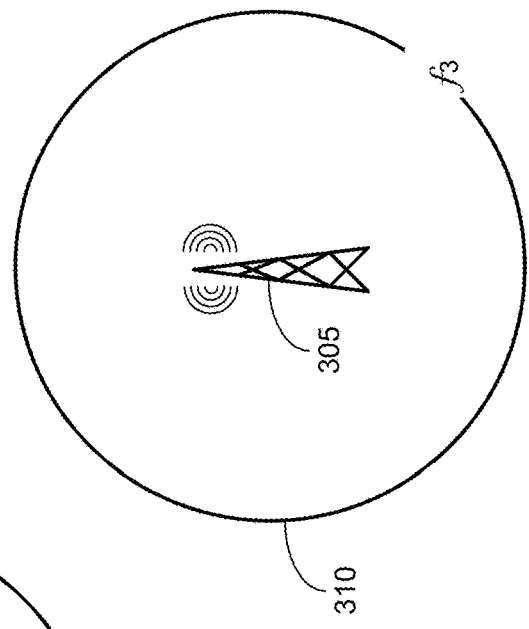
Figure 4C:
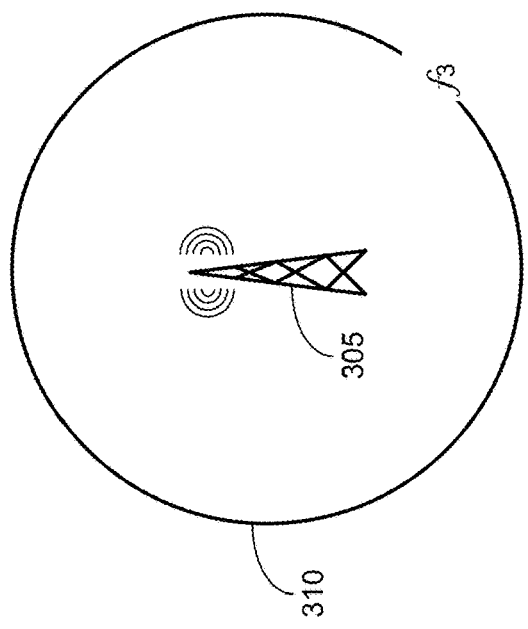

As shown in FIG. 4C, yet another map 410 can be created at a third frequency, $f_3$. In this case, while the lower frequency, $f_3$, provides greater range, the cell towers 305 are nonetheless fairly spaced apart. This can result in some lack of coverage in certain areas. Of course, in reality, cell towers 305 are placed close together to prevent areas without coverage. In addition, many UEs 235 operate on multiple frequencies to improve the possibility that a compatible cell tower 305 is always within range.

Figure 5A:
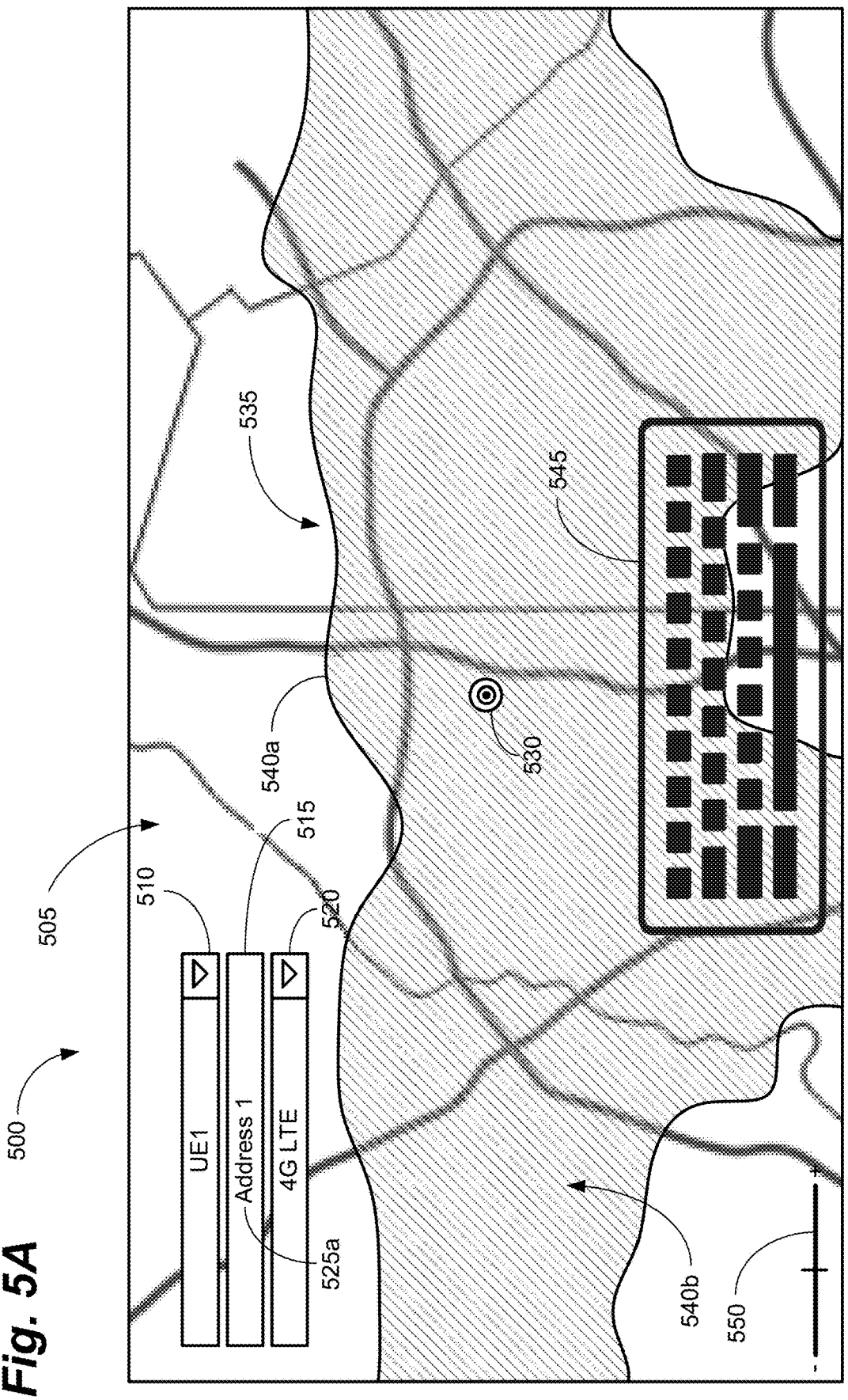
FIG. 5A is a graphical user interface depicting cellular frequency coverage for a first type of user equipment (UE1) at a first location of interest ("Address 1") for a first type of coverage (4G LTE), in accordance with some examples of the present disclosure.

As shown in FIG. 5A, therefore, each map 400, 405, 410 can be part of a "master map" GUI 500 to enable users to determine the best UE 235 for their needs. As shown, in some examples, the GUI 500 can comprise a map 505, UE selection box 510, an address box 515, and a connection-type box 520. The UE selection box 510 can be a list, a drop-down menu, or text entry designed to input the UE 235 of interest. So, for example, if a user is interested in a first UE, UE1, the user can select or enter UE1 into the UE selection box 510.

As shown in FIG. 5A, therefore, the user can enter a first UE 235, UE1, into the UE selection box 510. One or more UEs 235 can be provided in the UE selection box 510 as a drop down menu, for example, listing various manufacturers and/or models. In some examples, the UE selection box 510 can have a search feature to enable the user to enter a brand, model number, serial number, or other information to locate the desired UE 235.

In still other examples, the UEs 235 in the UE selection box 510 can be divided into groups by their operating frequencies. In other words, if a particular UE 235, UE1, is found to have a connection issue in a particular area, for example, it is difficult to choose a more effective UE 235, UE2, without knowing that it operates on a different frequency than UE1. This can result in the user simply choosing another UE 235 at random, UE2, which may have the same frequency issue as UE1. In this manner, if the UEs 235 are grouped by frequency, or frequency range, the user can simply choose a UE 235, UE2, in a different frequency group, knowing that it operates at a different frequency than UE1.

Similarly, when chosen, a UE's 235 operating frequency may be displayed in the UE selection box 510, or elsewhere on the screen for the user's reference. As mentioned above, UEs 235 tend to work on different frequencies for different connection types (e.g., 2G vs. 3G vs. 4D LTE). To this end, in some examples, the frequency, or frequency range, for a particular UE 235 can be displayed based on what connection type is selected in the connection-type box 520. In other examples, all of the frequency ranges for each type of connection for the UE 235 selected in the UE selection box 510 can be displayed somewhere on the GUI 500.

The granularity of the UE selection box 510 can be dependent on the number of different frequencies used by different UEs 235, among other things. In other words, some manufacturers may use the same frequencies, or frequency ranges, for all UEs 235. This can enable all of the models provided by the manufacturer to be listed together (e.g., "all Manufacturer 1 UEs" can be listed together). Other UEs 235 may have different frequencies based on model, generation, or other factors, and can be listed accordingly. So, for example, if different models from the same manufacturer use different frequencies, each model can be listed separately.

In some examples, the GUI 500 can be service provider specific. In this case, the UE selection box 510 can be limited to only those UEs 235 that the service provider offers or stocks. In other examples, to facilitate attracting customers from other service providers, the UE selection box 510 can include UEs 235 provided by the service provider and one or more competitors. In some examples, the UE selection box 510 may be limited to current generation UEs 235 to reduce clutter in the UE selection box 510 (e.g., older models may be limited to legacy connections).

In some examples, the user can also enter a first location of interest 525a into the address box 515. This can include, for example, an actual address, a zip code, or an area code. In some examples, the user may wish to enter a first address into the address box 515, such as a home address to check that address for compatibility. If the first address appears to be compatible with UE1, then the user may wish to check a second address, such as a work address for compatibility.

As discussed above, service providers generally operate on different frequencies for different types of connections (e.g., 2G, 3G, 4G LTE, 5G, etc.). To this end, in some examples, the GUI 500 can include a connection-type box 520. As the name implies, the connection-type box 520 can enable the user to look at specific types of connections at the locations of interest 525. In this manner, if a state-of-the-art connection is not available, the user may nonetheless find that a suitable legacy-type connection is available. If the user tends to only check e-mails at home, for example, then a 3G connection may be suitable, as long as a faster connection (e.g., 4G LTE) is available elsewhere (e.g., at work). In some examples, older and/or lower powered devices can actually work more efficiently on legacy connections. To this end, a user with an older and/or lower powered device may wish for the GUI to display only certain legacy connections (e.g., less than 3G).

In some examples, the connection-type box 520 can enable a user to select a minimum connection type, or minimum connection range. In other words, some users may need only minimal data services, for example, and thus, may only require a 3G connection or better. In this case, in addition to providing specific connection types, the connection-type box 520 may also provide a minimum connection type or a minimum connection range, where the minimum connection range includes the minimum connection type (e.g., 3G) and any faster connection types (e.g., 4G LTE and 5G). Thus, the connection-type box may include, for example, "at least a 3G connection" or "3G connections and higher". In this manner, the user can check all connection types relevant to their needs in a single input, while still eliminating connection types that do not meet their needs.

Using this information, the GUI 500 can first retrieve a list of compatible frequencies for UE1 from a UE frequency database. The UE frequency database can be provided by the manufacturer of UE1, for example, or can be compiled by the service provider or other entity. UE1 may be able to connect to a 4G LTE cell tower 305, for example, using two or more frequencies. Thus, any of these compatible frequencies could provide adequate performance and can be included in the GUI 500.

The frequencies provided by the UE frequency database can then be compared to the frequencies detailed on the individual frequency maps 400, 405, 410. If UE1 is compatible with $f_1$, $f_2$, and $f_3$, for example, then these frequencies can be combined into a single map 505 on the GUI 500. The GUI 500 can provide an accurate overview of how UE1 is predicted to perform in given geographic location, or location of interest 525, based at least on whether UE1 uses frequencies compatible with nearby cell towers 305. The GUI 500 can then provide areas of compatibility proximate the location of interest 525 in graphical form.

In some examples, as shown, the first location of interest 525a provided in the address box 515 can be centered on the GUI 500. Centering the first location of interest 525a on the GUI 500 can enable the user to make an assessment of the first location of interest 525a and the surrounding area. So, for example, the user may be able to determine that coverage at the first location of interest 525a and a local shopping area that the user frequents are both good.

In some examples, the first location of interest 525a can be denoted by an icon 530 in the GUI 500. In some examples, the GUI 500 can provide an easy to understand representation of where a particular UE 235, e.g., UE1, is compatible with local cell towers 305. As shown, in some examples, the GUI 500 can indicate an area of compatibility with a map overlay 535 comprising at least an outline 540a. In some examples, a shaded area 540b within the outline 540a can also be provided, for example, to distinguish between areas where the frequencies associated with UE1 are available or unavailable. In this case, the GUI 500 indicates that the selected area of interest 525 is well covered for the frequencies associated with UE1. As discussed above, for UEs 235 that are compatible with multiple frequencies, the map overlay 535 can comprise a combination of multiple map overlays, where each map overlay represents one of the multiple frequencies. These individual map overlays can then be combined to form a "master" map overlay 535 that provides compatibility areas for each frequency combined into a single map overlay 535.

In some examples, the GUI 500 can include additional inputs to enable the user to enter information and/or adjust the scale of the map 505. In some examples, the GUI 500 can include a touchscreen, or virtual keyboard 545. The virtual keyboard 545 can enable the user to enter UE 235 and address information, for example, without requiring an external keyboard. Of course, in some examples, the GUI 500 can be implemented in a kiosk, for example, that includes an external keyboard.

In some examples, the GUI 500 can also comprise a zoom control 550. The zoom control 550 can enable the user to change the scale of the map 505 to suit their needs. In some examples, the GUI 500 can be set to provide the map 505 at a default scale in response to the user's inquiry. The user may then wish to move the scale of the map up and down to view a larger or smaller portion of the map. If the user works and lives in close proximity, for example, the user may be able to adjust the zoom to cover both locations, obviating the need to enter two locations of interest 525 separately.

Figure 5B:
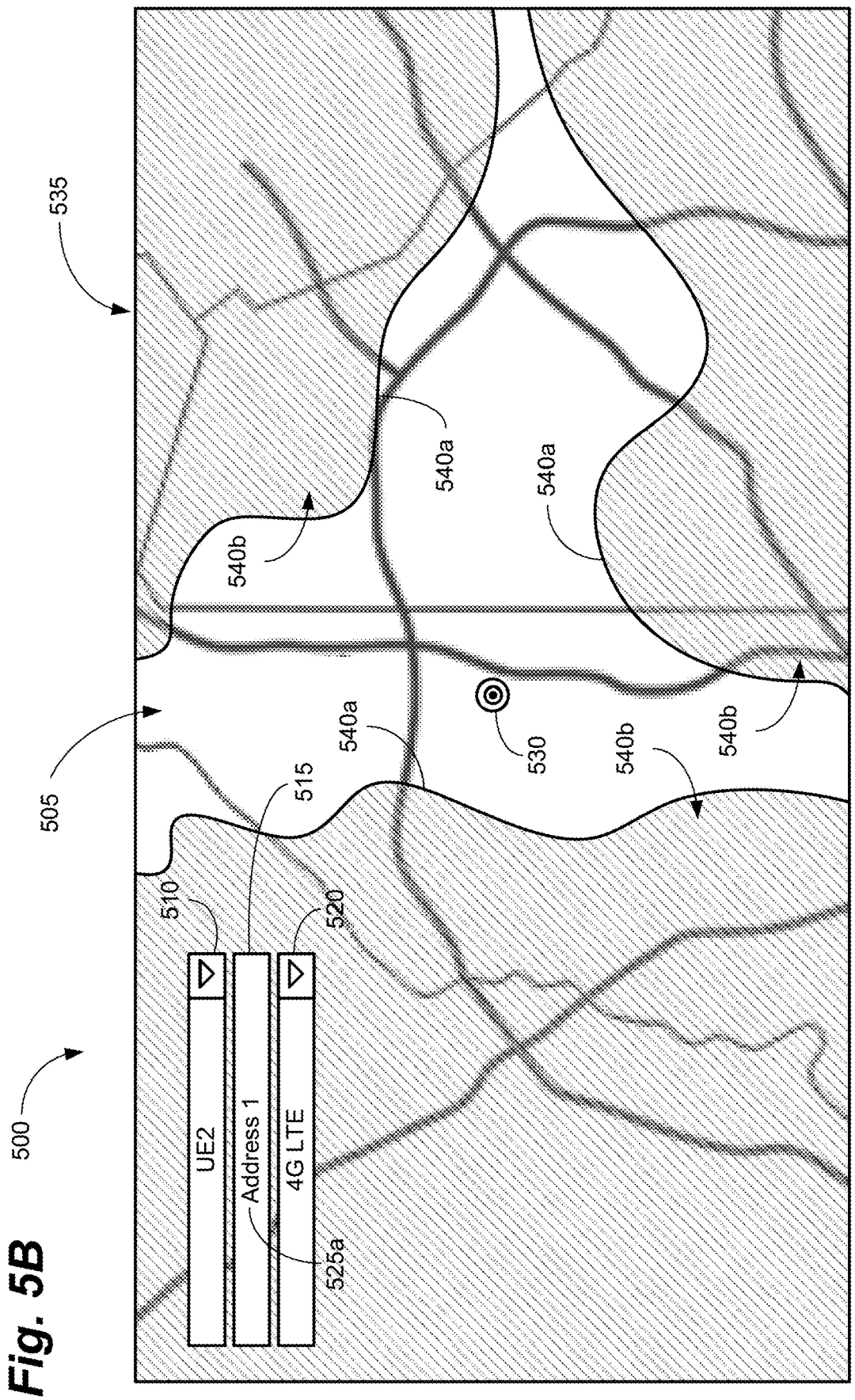
FIG. 5B is the graphical user interface of FIG. 5A depicting cellular frequency coverage for a second type of user equipment (UE2) at Address 1 for 4G LTE, in accordance with some examples of the present disclosure.

As shown in FIG. 5B, the user can then check for compatibility in the first location of interest 525a with a second UE, UE2. As shown, in this case, the GUI 500 indicates that the local cell towers 305 proximate the first location of interest 525a are not compatible with the frequencies used by UE2 for a 4G LTE connection. As a result, without having to take UE2 home and to work to test it, the user has determined that UE2 may not be the best choice based on a lack of compatibility in the second location of interest 525b.

Figure 5C:
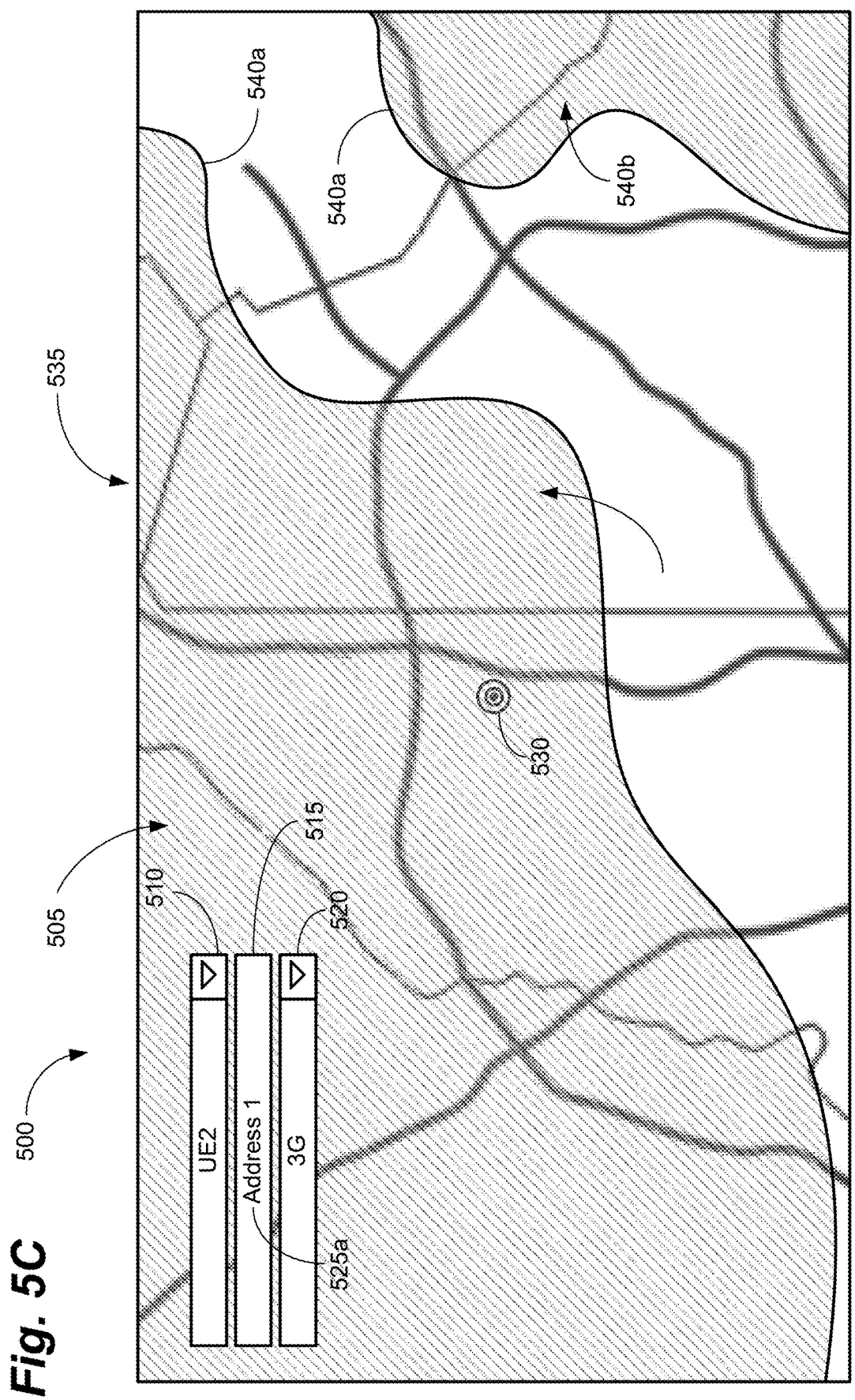
FIG. 5C is the graphical user interface of FIG. 5A depicting cellular frequency coverage for UE2 at Address 1 for a second type of coverage (3G), in accordance with some examples of the present disclosure.

As mentioned above, cell towers 305 can operate on a variety of frequencies and may be able to connect to UEs 235 using one or more different types of connections, including legacy connections. As a result, while UE2 may be unable to connect to local cell towers 305 using a 4G LTE connection, for example, UE2 may be nonetheless be able to connect to the local cell towers 305 using a legacy connection (e.g., 2G or 3G). To this end, as shown in FIG. 5C, in some examples, the GUI 500 can also comprise a connection-type box 520.

As the name implies, the connection-type box 520 can include all of the connection types the service provider offers. Some high-end service providers may only provide the latest connection types (e.g., 4G LTE or 5G at present), while discount providers may take advantage of low cost, underutilized connections such as, for example, 2G and 3G connections. Regardless, the user may nonetheless wish to choose UE2 because it has more sophisticated features, more aesthetic design, a faster processor, or other advantages over UE1, for example, despite the fact that UE2 can only connect to a 3G connection at home.

In some cases, the user may use the UE very little at home, for example. As a result, the user may be more concerned with (1) the features of UE2 and (2) that a good connection is available at work. The connection-type box 520 can enable the user to view coverage maps for different kinds of connections and then to make a decision based on the available connections. Thus, while no 4G LTE coverage is available at the first location of interest 525a for UE2 (FIG. 5B), 3G coverage may nonetheless be available (FIG. 5C).

Figure 5D:
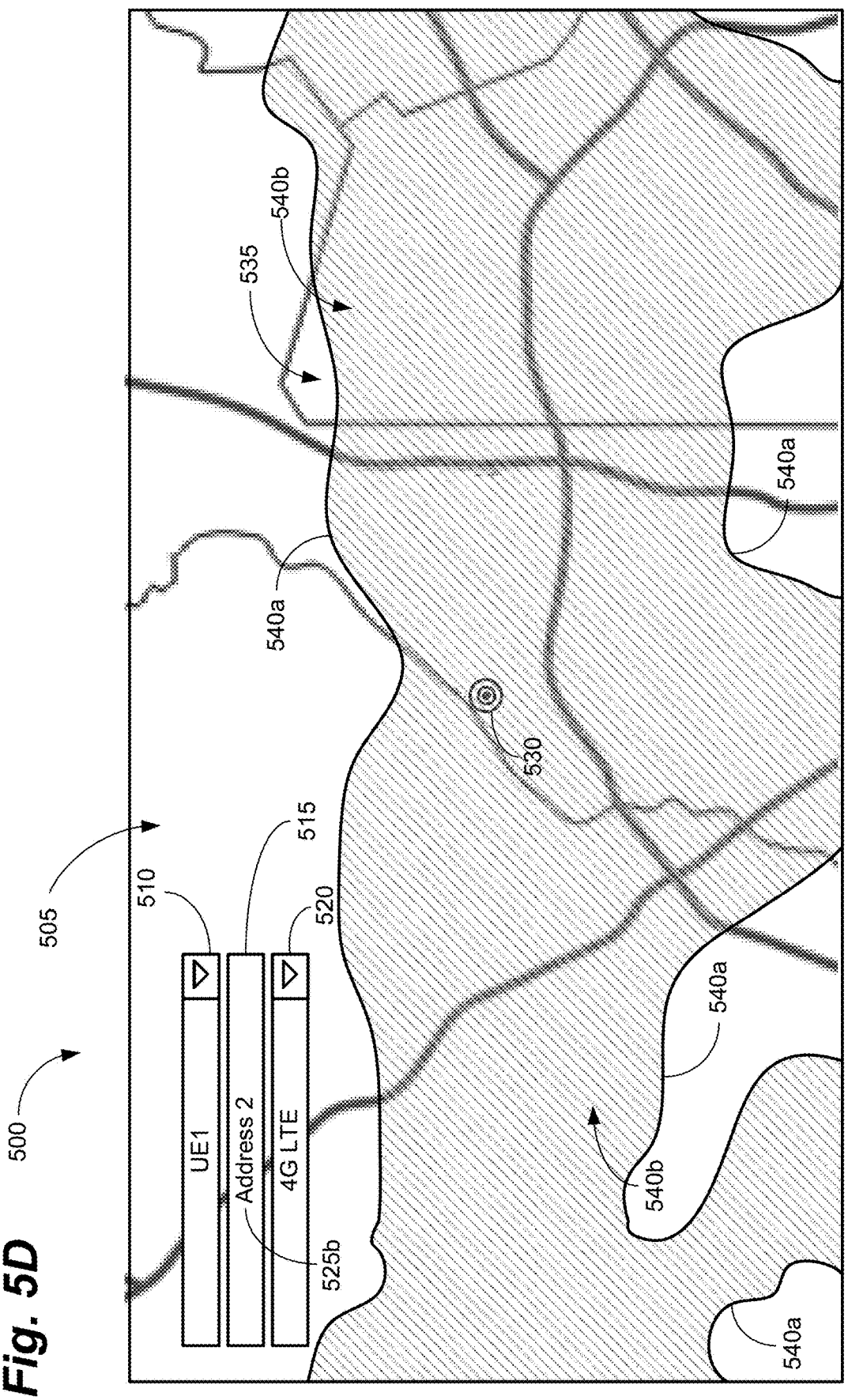
FIG. 5D is the graphical user interface of FIG. 5A depicting cellular frequency coverage for UE1 at a second location of interest ("Address 2") for 4G LTE, in accordance with some examples of the present disclosure.

As shown in FIG. 5D, based on the user's findings for the first location of interest 525a, the user may then wish to check a second location of interest 525b. The user may wish to check their home address first, for example, and then their work location, or another significant location. In this case, UE1 has 4G LTE coverage in the first location of interest

525a (FIG. 5A) and the second location of interest 525b (FIG. 5D). As a result, UE1 is a viable choice for the user in both locations of interest 525a, 525b, at least based on UE1's compatibility with nearby cell towers 305.

Of course, as discussed above, if UE1 is not appealing to the user from a design standpoint, the features it provides, or other factors, the user can choose UE2. And although UE2 does not have 4G LTE coverage in the first location of interest 525a, it does have 3G coverage in the first location of interest 525a. If UE2 has 4G LTE coverage in the second location of interest 525b, therefore, the user may still choose UE2 based on other factors. If the first location of interest 525a is the user's home and the in the second location of interest 525b is the user's work, for example, the user may be satisfied with 3G coverage at home.

Of course, the user can use the GUI 500 to check as many locations of interest 525 and as many UEs 235 (e.g., UE1, UE2 . . . UEN) as are available limited only by the amount of time the user wishes to invest. The user may wish to check coverage at home, at work at their parent's house, at several friend's houses, their significant other's house, etc. The user may discover, for example, that several UEs 235 will have a 4G LTE connection in all of their locations of interest 525. In this case, the user is free to choose a UE 235 based on cost, design, features, processor speed, or other factors.

In addition, because the UE 235 has been chosen at least in part based on its frequency compatibility with local cell towers 305, problems associated with reception and network performance are reduced. In other words, while other variables like topography and interference still exist, the problem of incompatible UEs 235 and cell towers 305 is eliminated. Thus, the user is not surprised when they use the UE 235 for the first time at home and discover that only a 3G connection is available. In this case, the user would know in advance of the situation and would have made a conscious decision to choose that UE 235 in spite of the connection speed.

This reduces the number of customer problems and complaints, reduces the cost associated with returning and replacing incompatible equipment, and generally improves the customer experience. If the user is apprised of what connection types are available in the location(s) of interest 525 to the user, then the user is less likely to return the UE 235 for different equipment. In addition, the GUI 500 removes the guesswork associated with identifying UEs 235 that will work in certain locations, and thus, reduces costs associated with returns and customer service. The GUI 500 can reduce workload at retail stores, service providers, and customer help lines by providing users with the necessary information to choose a UE 235 that meets their needs at the outset.

The GUI 500 can be provided on a kiosk or computer in the retail store, for example, to enable customers to review frequency compatibilities as part of the retail shopping experience. So, for example, a customer may select a UE 235 based on its design or features, for example, and then check various locations of interest 525 for compatibility with cell towers 305 in those areas. If the UE 235 is found to be incompatible with one or more locations of interest 525, the customer can check for legacy connections or simply choose another UE 235 that operates on a different frequency. In other examples, the GUI 500 can be provided on an internet website or a mobile application ("app"), for example, to enable online shoppers to make a more informed decision.

Figure 6:
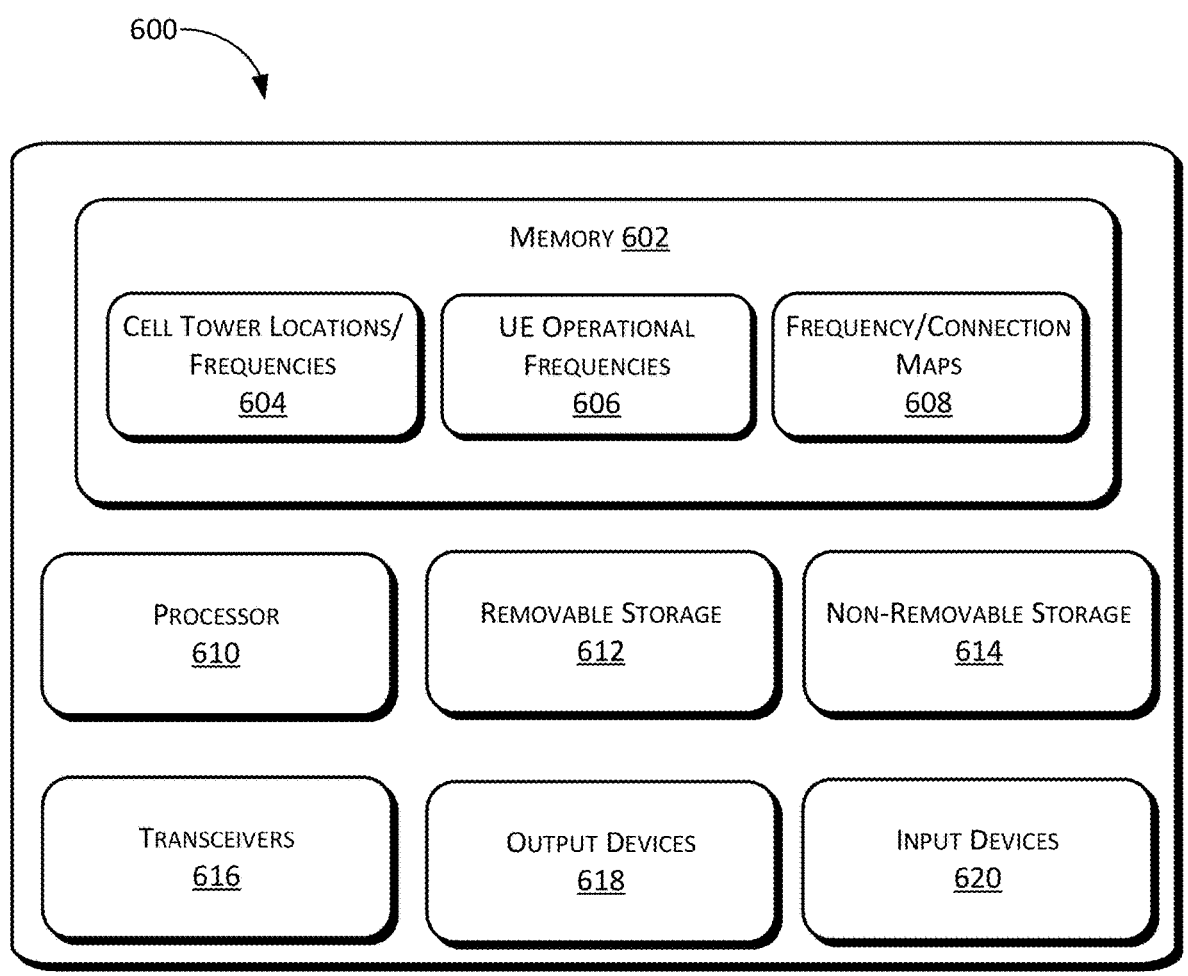
FIG. 6 is a component level schematic for a management module for the system, in accordance with some examples of the present disclosure.

As shown in FIG. 6, examples of the present disclosure can comprise a graphical user interface module, or system 600, to provide the GUI 500, regardless of implementation. FIG. 6 illustrates a component level view of the system 600 or computer. As discussed below, the system 600 can comprise memory 602 configured to receive and/or compile cell tower 305 locations and frequencies 604, UE 235 operational frequencies 606, and frequency and connection maps 608 for applicable cell towers 305, and other relevant information. Also, the system 600 can include one or more processor(s) 610, removable storage 612, non-removable storage 614, transceivers 616, output device(s) 618, and input device(s) 620. The system 600 may additionally contain a policy engine to receive, create, transmit, and manage the various databases and frequency maps.

In various implementations, system memory 602 can be volatile (such as RAM), non-volatile (such as ROM, flash memory, etc.), or some combination of the two. The cell tower locations and frequencies database 604 can include the cell towers 305 used by the service provider, their locations, and the frequencies at which they operation. The cell tower locations and frequencies database 604 can include the cell towers 305 that are owned by the service provider, as well as cell towers 305 that are leased or licensed by the service provider. In some examples, these can include cell towers 305 on which the service provider merely leases bandwidth, for example.

The cell tower locations and frequencies database 604 can include the locations of all cell towers 305. This can be stored, for example, using GPS coordinates, map coordinates, or other suitable means. The cell tower locations and frequencies database 604 can also include the types of connections (e.g., 2G, 3G, 4G LTE, etc.) each cell tower 305 provides and the frequencies at which the cell towers 305 operate. As discussed above, each cell tower 305 may provide multiple frequencies with a connection type and multiple connection types at different frequencies. In some examples, the cell tower locations and frequencies database 604 can also include an estimated, or nominal[1], range for each frequency.

[1] Nominal is used here in the engineering sense. In other words, a frequency provides a certain theoretical range minus some factor for interference, obstacles, and other variables. Thus, a cell tower is operating nominally if, for example, it is operating at a predetermined frequency and power level and providing some estimated range (e.g. 5 miles±500 yards). Because different frequencies and transmitters have widely different ranges, this term is not intended to be limiting, but merely to convey a range of normal operation.

The memory 602 can also include the UE operational frequency database 606. This can include a list of relevant UEs 235 and the frequencies at which they operate for each connection type. As mentioned above, each UE 235 may be capable of operating at multiple frequencies, or frequency ranges, for a particular connection type. In addition, each UE 235 may be capable of connecting at multiple frequencies, or frequency ranges, to provide multiple connection types. So, for example, a particular UE 235 may be able to connect to a cell tower 305 at two frequency ranges for a 4G LTE connection and one frequency range for each legacy connection type (e.g., 2G and 3G).

The UE operational frequency database 606 can include a list of each UE 235 currently offered by the service provider. In some examples, the UE operational frequency database 606 can also include a certain number of legacy UEs 235 that are still in wide use, for example, or are popular in a particular location. In some examples, the UE operational frequency database 606 can also include one or more UEs 235 provides by major competitors in the area. This can enable users dissatisfied with their current service provider to determine whether they would be better served by the service provider.

The memory 602 can also include a frequency and connection-type map database 608. As the name implies, the frequency and connection-type map database 608 can contain the compiled data from the other two databases 604, 606 to provide the aforementioned maps for use with the GUI 500. The frequency and connection-type map database 608 can be in the form of raw data (e.g., GPS coordinates, frequencies, connection types, etc.) or can be actual graphical representations. In some examples, rather than being stored separately, the frequency and connection-type map database 608 can be generated in real-time by the processor 610 in response to user inputs.

The frequency and connection-type map database 608 can include maps for each type of connection and each frequency, frequencies, or frequency ranges for each type of connection. So, for example, if the UEs 235 handled by the service provider operate on one of four frequencies for a 4G LTE connection, one or two frequencies for a 3G connection, and one of two frequencies for a 2G connection in a particular area, for example, the frequency and connection-type map database 608 can contain eight separate maps, or map overlays, for that location.

In some implementations, the processor(s) 610 can comprise a central processing unit (CPU), a graphics processing unit (GPU), or both a CPU and a GPU, or any other sort of processing unit. The CPU can be responsible for the compiling and creating the various, GUIs, and databases discussed above. In some examples, the GPU can be responsible for receiving data from the various databases 604, 606, 608 and creating images or maps for the GUI 500, among other things. The GPU can process and add the aforementioned outlines 540a and areas 540b, for example, to enable the customer to determine graphically what coverage options are available in their areas of interest 525.

The system 600 may also include additional data storage devices (removable and/or non-removable) such as, for example, magnetic disks, optical disks, or tape. Such additional storage is illustrated in FIG. 6 by removable storage 612 and non-removable storage 614. The removable storage 612 and non-removable storage 614 can store the various programs and algorithms for the mapping process and can include a the databases 604, 606, 608, as well as other information relevant to generating the GUI 500 and other system features.

Non-transitory computer-readable media may include volatile and nonvolatile, removable and non-removable tangible, physical media implemented in technology for storage of information, such as computer readable instructions, data structures, program modules, or other data. System memory 602, removable storage 612, and non-removable storage 614 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the system 600. Any such non-transitory computer-readable media may be part of the system 600 or may be a separate database or databank.

In some implementations, the transceivers 616 include any sort of transceivers known in the art. For example, the transceivers 616 may include wired communication components, such as a wired modem or Ethernet port, for communicating with other networked devices. Also or instead, the transceivers 616 may include wireless modem(s) to facilitate wireless connectivity with other computing devices, the Internet, and with UEs 235. Further, the transceivers 616 may include a radio transceiver that performs the function of transmitting and receiving radio frequency communications via an antenna (e.g., WiFi or Bluetooth®).

In some examples, the system 600 can be located at the store or retail location for the service provider and can be part of a store wired and/or wireless network. In other examples, the system 600 can be remote to the store and can be located at, for example, a website service provider, remote server bank, or other remote location. The system 600 may be in communication with the store network via the internet, a private network, or virtual private network (VPN) and can control or provide information to remote terminals, such as kiosks in the stores. In other examples, the system 600 and the kiosks can comprise a standalone network and can be connected by Wi-Fi or cellular network connection to operate substantially autonomously from the store network.

In some implementations, the output devices 618 include any sort of output devices known in the art, such as a display (e.g., a liquid crystal display), a touchscreen display, speakers, a vibrating mechanism, or a tactile feedback mechanism to provide an interactive map to the user. In some examples, the output devices can play various sounds based, for example, on whether the desired connection type is available at a location of interest 525. Output devices 618 also include ports for one or more peripheral devices, such as headphones, peripheral speakers, or a peripheral display.

In some examples, the output devices 618 can include one or more virtual, or augmented, reality devices. The system 600 can include, for example, virtual reality goggles, glasses, or other means to provide the user with a 3D map and to enable the user to view the map from multiple angles. In some examples, the output devices 618 can include a holographic projector, for example, to enable the GUI 500 and other information to be displayed in 3D.

In various implementations, input devices 620 include any sort of input devices known in the art. For example, input devices 620 may include a camera, a microphone, a keyboard/keypad, or a touch-sensitive display. A keyboard/keypad may be a standard push button alphanumeric a multi-key keyboard (such as a conventional QWERTY keyboard), a touchscreen, or one or more other types of keys or buttons, and may also include a joystick, wheel, and/or designated navigation buttons, or the like. In some examples, the GUI 500 can include a touchscreen keyboard, for example, to enable the user to enter the necessary information into the kiosk using the touchscreen, rather than requiring the use of an external keyboard.

In some examples, the input devices 620 can include a touchscreen to enable the user to use gestures (e.g., pinch-to-zoom). In other examples, the input devices 620 can include a microphone and voice recognition software to enable the user to use voice commands for the various data entries and to zoom-in, zoom-out, or use other features. In some example, the voice recognition software can run locally on the processor 610. In other examples, the system 600 can send the voice commands to a central processing system via the transceiver 616, similar to UE 235 voice recognition.

Figure 7:
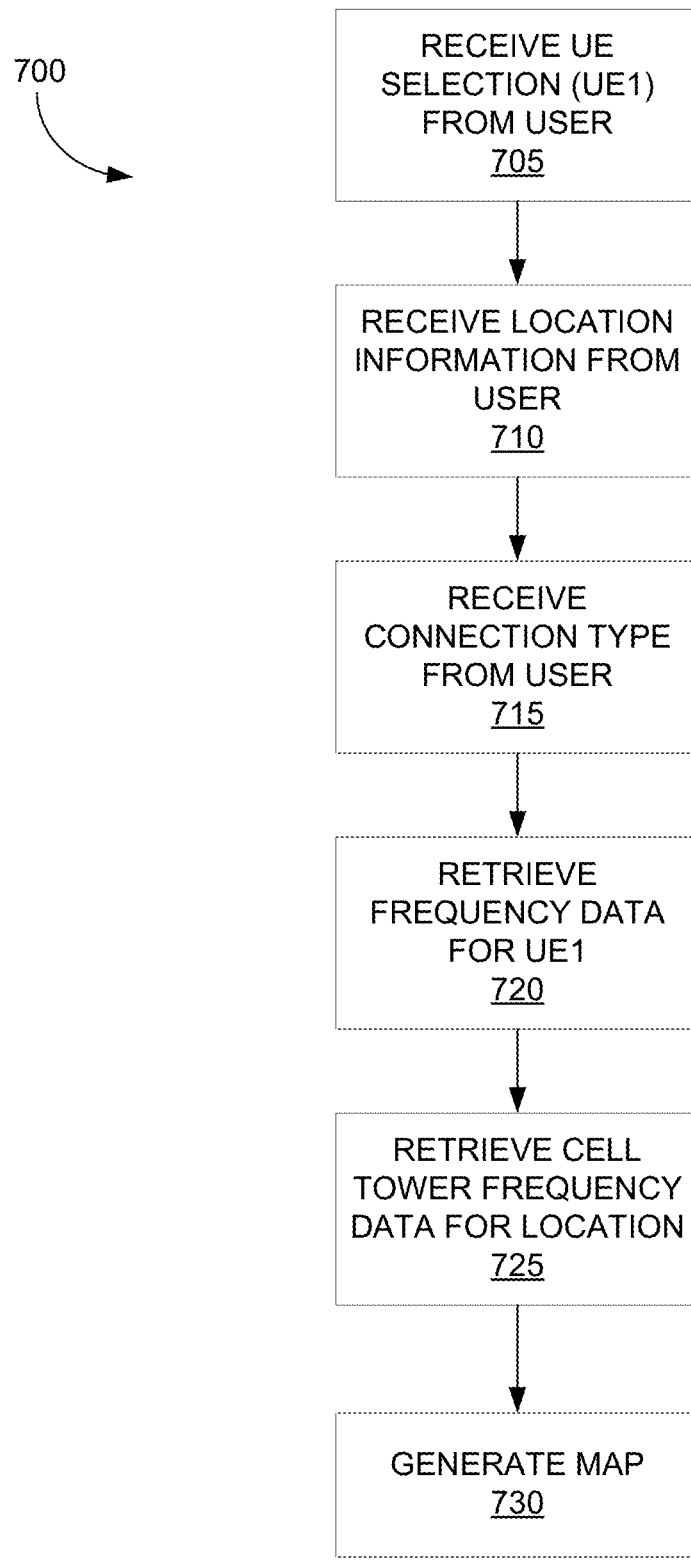
FIG. 7 is a flowchart depicting a method for generating a frequency compatibility map for a UE, in accordance with some examples of the present disclosure.

As shown in FIG. 7, examples of the present disclosure can also comprise a method 700 for producing a frequency compatibility map. At 705, the user can provide a UE selection (e.g., UE1 discussed above). The user can provide their selection via a virtual keyboard 545, for example, an external keyboard, or a drop down menu on the GUI 500. As discussed above UE1 can be limited to the UEs 235 the service provider supports, or can include other UEs 235 to enable the user to check for compatibility with UEs 235 from other service providers, for example.

At 710, the method 700 can include receiving location information from the user associated with one or more locations of interest 525. As discussed above, the location information can include an address, zip code, GPS coordinates, or other data. The user can review multiple locations of interest 525 one at a time to ensure UE compatibility with local cell towers 305.

In some examples, the method 700 can include providing a frequency compatibility map for all connection types or for a default connection type (e.g., 4G LTE). in other words, in some examples, the user may simply wish to determine if any cell coverage is available in the location of interest 525. In other examples, at 715, the user can optionally provide the desired connection type. So, for example, if the user is only interested in a particular UE 235 if it is compatible with cell towers 305 near the location of interest 525, the map can be tailored in that manner.

At 720, the processor 610 can retrieve the frequency data for UE1 from the UE operational frequency database 606. The UE operational frequency database 606 can include the operational frequencies for uploads and downloads for UE1 (and other UEs 235) for the relevant connection type(s).

At 725, the processor 610 can retrieve the location and frequency data for the cell towers 305 proximate the location of interest from the cell tower location and frequency database 604. In some example, the processor 610 can retrieve this data based on a default distance from the location of interest 525 (e.g., within 5 miles), or within a range set by the user (e.g., 2, 5, 10, or 25 miles) as set by the zoom control 550, or other means.

At 730, the processor 610 can combine one or more maps to output the map 505 for the GUI 500. In some examples, because UE1 and the local cell towers 305 may be capable of operating at more than one frequency, the processor 610 can combine multiple maps, where each maps depicts a single frequency, or frequency range (e.g., 5 MHz or 10 MHz "blocks"), into a single map depicting the overall frequency compatibility for the UE in the area of interest.

Of course, the method 700 can be repeated for as many UEs 235 are provided in the GUI 500, or other interface, and for as many locations of interest 525 for which cell tower 305 data is available. For nationwide carriers, for example, the user may be able to choose locations of interest 525 anywhere in the country. The method 700 enables users to verify compatibility of UEs 235 with multiple locations of interest 525 prior to purchasing the UE 235, for example. In this manner, the number of returned UEs 235 is reduced and customer satisfaction is improved.

Examples of the present disclosure, therefore, relates to a GUI 500, system 600, and method 700 for providing users with UE 235 frequency maps relevant to their chosen UE 235 and their locations of interest 525. The GUI 500, system 600, and method 700 enable the user to review compatibilities with various UEs 235, using various types of connections (e.g., 2G, 3G, or 4G LTE), in multiple locations of interest 525. The GUI 500, system 600, and method 700 enable users to accurately predict UE 235 performance in the locations of interest 525 rather than using conventional non-specific coverage maps and trial and error. The system increases customer satisfaction and reduces service provider work load and costs.

While several possible examples are disclosed above, examples of the present disclosure are not so limited. For instance, while a systems and methods for use with cellular phone systems has been disclosed, other communications systems or subsystems could be analyzed in a similar manner without departing from the spirit of the disclosure. In addition, the location and configuration used for various features of examples of the present disclosure such as, for example, the order of steps, the types of cellular technologies, and the components of the GUI 500 can be varied according to a particular network or application that requires a slight variation due to, for example, the size or construction of the network, the communication protocols, or the UEs used. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A computing device comprising:
  a display;
  one or more processors;
  one or more memory storage devices;
  a policy engine stored in the one or more memory storage devices and executable by the one or more processors to:
    receive an operating frequency at which a first user equipment (UE1) can operate from a user equipment (UE) operational frequency database, the UE operational frequency database associating UEs and frequencies at which the UEs can operate; and
    receive first data associated with one or more cell towers proximate a location of interest and operating at the operating frequency from a cell tower locations and frequencies database, the first data comprising locations and estimated transmission ranges at the operating frequency for the one or more cell towers; and
  a graphical user interface module stored in the one or more memory storage devices and executable by the one or more processors to generate second data for displaying a graphical user interface (GUI), the GUI comprising:
    one or more GUI inputs to receive one or more inputs from a user, the one or more GUI inputs including at least a choice of the UE1 and the location of interest;
    an indication of the operating frequency;
    a map representing a geographic location that is based, at least in part, on the location of interest received from the user;
    an icon located on the map in the location of interest; and
    a map overlay, overlying the map, the map overlay indicating one or more estimated ranges within the geographic location where the one or more cell towers transmit signals at the operating frequency of the UE1.

2. The computing device of claim 1, wherein the one or more GUI inputs include a user equipment (UE) selection box to receive a selection of one of a plurality of UEs.

3. The computing device of claim 1, wherein the one or more GUI inputs include a connection-type box to receive a selection of one of a plurality of connection types to be displayed by the map overlay.

4. The computing device of claim 3, wherein:
the connection-type box comprises a minimum connection type;
the map overlay comprises two or more individual map overlays combined into a single master map overlay;
the single master map overlay includes all connection types faster than the minimum connection type; and
each individual map overlay indicates one or more estimated ranges within the geographic location where the one or more cell towers transmit at a single frequency or frequency range associated with the UE1.

5. The computing device of claim 3, wherein the plurality of connection types comprise two or more of 2G cellular connections, 3G connections, 4G LTE cellular connections, and 5G cellular connections.

6. The computing device of claim 4, wherein the single master map overlay is filtered to show instances of the one or more estimated ranges where the one or more cell towers transmit at frequencies supported by the minimum connection type.

7. The computing device of claim 1, wherein:
the map overlay comprises two or more individual map overlays combined into a single master map overlay; and
each individual map overlay indicates at least one of the one or more estimated ranges within the geographic location where the one or more cell towers transmit at a single frequency or frequency range.

8. The computing device of claim 1, wherein:
the display comprises a touchscreen display; and
the one or more GUI inputs comprises a virtual keyboard.

9. A method comprising:
receiving a first location of interest at a first input of a graphical user interface (GUI);
receiving a selection of a first user equipment (UE1) of a plurality of UEs from a second input of the GUI;
retrieving, with a processor, a first frequency at which the UE1 can operate from a user equipment (UE) operational frequency database, the UE operational frequency database associating UEs and frequencies at which the UEs can operate;
retrieving, with the processor, first data associated with one or more cell towers proximate the first location of interest from a cell tower locations and frequencies database, the first data comprising locations, operating frequencies, and estimated transmission ranges at the operating frequencies for the one or more cell towers;
identifying from the first data one or more first cell towers operating at the first frequency;
generating, based at least in part on the first frequency and the first data associated with the one or more first cell towers, a map that is generated using a graphics processing unit, the map including:
an icon associated with the first location of interest;
a map representing a geographic location proximate the first location of interest; and
a map overlay indicating the estimated transmission ranges within the geographic location where the one or more first cell towers transmit at the first frequency; and
displaying the map on the GUI.

10. The method of claim 9, wherein:
receiving a selection of the UE1 from the second input of the GUI comprises receiving a selection of the UE1 from a drop-down menu of the GUI; and the drop-down menu contains a plurality of UEs available from a service provider.

11. The method of claim 9, further comprising:
receiving a first connection type from a third input of the GUI;
wherein the map overlay further indicates the one or more first cell towers and estimated transmission ranges for frequencies supported by the first connection type at which the UE1 can operate.

12. The method of claim 11, wherein the first connection type comprise one of 2G cellular connections, 3G connections, 4G LTE cellular connections, or 5G cellular connections.

13. The method of claim 11, wherein:
the map overlay comprises two or more individual map overlays combined into a single master map overlay; and
each individual map overlay indicates one or more estimated ranges within the geographic location where the one or more first cell towers transmit at a single frequency or frequency range associated with the UE1.

14. The method of claim 13, wherein:
the first connection type comprises a minimum connection type;
the single master map overlay includes all connection types faster than the minimum connection type as a minimum connection range; and
the minimum connection range comprises two or more of 2G cellular connections, 3G connections, 4G LTE cellular connections, and 5G cellular connections.

15. The method of claim 9, further comprising:
receiving a second location of interest at the first input of the GUI;
retrieving, with the processor, second data associated with one or more second cell towers proximate the second location of interest from the cell tower locations and frequencies database;
generating, based at least in part on the first frequency and the second data, a second map that is generated using the graphics processing unit, the map including:
a second icon associated with the second location of interest;
a second map representing a geographic location proximate the second location of interest; and
a second map overlay indicating the estimated transmission ranges within the geographic location where the one or more second cell towers transmit at the first frequency; and
displaying the second map on the GUI.

16. The method of claim 15, wherein:
the second map overlay comprises two or more individual map overlays combined into a single master map overlay; and
each individual map overlay indicates the estimated transmission ranges within the geographic location where the one or more second cell towers transmit at a single frequency or frequency range.

17. The method of claim 13, wherein the single master map overlay is filtered to show instances of the estimated transmission ranges where the one or more second cell towers transmit at frequencies supported by a minimum connection type.

18. The method of claim 9, wherein:
receiving the first location of interest at the first input of the GUI comprises receiving an address associated with the first location of interest from a virtual keyboard of a touchscreen of the GUI; and receiving the selection of the UE1 from the second input of the GUI comprises receiving the selection of the UE1 from a drop-down menu of the GUI.

19. A non-transitory computer-readable media comprising instructions that when executed by a processor, cause the processor to perform acts comprising:

receiving a first location of interest at a first input of a graphical user interface (GUI);

receiving a selection of a first user equipment (UE1) of a plurality of UEs from a second input of the GUI;

retrieving, with a processor, a first frequency at which the UE1 can operate from a user equipment (UE) operational frequency database, the UE operational frequency database associating UEs and frequencies at which the UEs can operate;

retrieving, with the processor, data associated with one or more cell towers proximate the first location of interest and operating at the first frequency from a cell tower locations and frequencies database, the data comprising locations and estimated transmission ranges at the first frequency for the one or more cell towers;

generating, based at least in part on the first frequency and the data associated with the one or more cell towers, a map that is generated using a graphics processing unit, the map including:

an icon associated with the first location of interest;

a map representing a geographic location proximate the first location of interest; and a map overlay indicating the estimated transmission ranges within the geographic location where the one or more cell towers operate at the first frequency; and displaying the map on the GUI.

20. The non-transitory computer-readable media of claim 19, wherein receiving a selection of the UE1 from the second input of the GUI comprises receiving a selection of the UE1 from a drop-down menu of the GUI; and the drop-down menu contains a plurality of UEs available from a service provider.

* * * * *